(12) United States Patent
Oshinowo et al.

(10) Patent No.: US 12,728,369 B2
(45) Date of Patent: Sep. 8, 2026

(54) WATER OIL SEPARATOR VESSEL WITH HYDROPHOBIC MESH TUBES

(71) Applicant: Saudi Arabian Oil Company, Dhahran (SA)

(72) Inventors: Olanrewaju Malcolm Oshinowo, Dhahran (SA); Fahd Ibrahim AlGhunaimi, Dhahran (SA); Young Chul Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 370 days.

(21) Appl. No.: 18/465,692

(22) Filed: Sep. 12, 2023

(65) Prior Publication Data

US 2025/0083072 A1 Mar. 13, 2025

(51) Int. Cl.

| | |
|---|---|
| ***B01D 17/02*** | (2006.01) |
| ***B01D 17/04*** | (2006.01) |
| ***B01D 17/12*** | (2006.01) |
| ***C02F 1/00*** | (2023.01) |
| ***C02F 1/40*** | (2023.01) |
| ***C02F 101/32*** | (2006.01) |
| ***C02F 103/10*** | (2006.01) |

(52) U.S. Cl.

CPC ....... *B01D 17/0214* (2013.01); *B01D 17/045* (2013.01); *B01D 17/12* (2013.01); *C02F 1/008* (2013.01); *C02F 1/40* (2013.01); *C02F 2001/007* (2013.01); *C02F 2101/32* (2013.01); *C02F 2103/10* (2013.01); *C02F 2201/005* (2013.01)

(58) Field of Classification Search

CPC .............. B01D 17/045; B01D 17/0214; B01D 17/0211; B01D 17/12; C02F 1/40; C02F 1/008

USPC .................................................. 210/521, 739

See application file for complete search history.

(56) References Cited

U.S. PATENT DOCUMENTS

| | | | |
|---|---|---|---|
| 4,180,457 | A | 12/1979 | Popp et al. |
| 4,308,136 | A | 12/1981 | Warne, Jr. |

(Continued)

FOREIGN PATENT DOCUMENTS

| | | | | |
|---|---|---|---|---|
| CN | 106115966 | A | * 11/2016 | ................ C02F 9/00 |
| CN | 207046908 | U | 2/2018 | |

(Continued)

OTHER PUBLICATIONS

Dan et al, CN 106115966, English machine translation provided, pp. 1-3 (Year: 2016).*

(Continued)

*Primary Examiner* — Claire A Norris

(74) *Attorney, Agent, or Firm* — Dinsmore & Shohl LLP

(57) ABSTRACT

Systems and a method for oil-in-water are provided. A water-oil separation plant (WOSEP) includes a gravity separation vessel, an inlet for an oil-in-water emulsion, an oil outlet for separated oil, a water compartment in the gravity separation vessel, and a water outlet from water compartment for separated water. A tube of hydrophobic mesh with an axis perpendicular to the water surface is disposed in the water compartment, wherein the top of the tube is above the water surface, and the bottom of the tube is below the water surface. An outlet coupled to the bottom of the tube allows oil and water to drain from the tube.

19 Claims, 11 Drawing Sheets

(56) References Cited

U.S. PATENT DOCUMENTS 4,333,835 A * 6/1982 Lynch .................. B01D 17/045 210/522
4,428,839 A 1/1984 Davies et al.
4,481,130 A 11/1984 Robertson
4,539,023 A 9/1985 Boley
4,581,134 A 4/1986 Richter, Jr. et al.
4,592,849 A 6/1986 McMillen
4,596,586 A 6/1986 Davies et al.
4,627,458 A 12/1986 Prasad
4,737,265 A 4/1988 Merchant, Jr. et al.
4,818,410 A 4/1989 Bellos et al.
4,961,858 A 10/1990 Spei et al.
5,068,035 A 11/1991 Mohr
5,256,305 A 10/1993 Hart
5,693,257 A 12/1997 Hart
5,885,424 A 3/1999 Davis et al.
5,928,524 A 7/1999 Casola
6,039,880 A 3/2000 Morataya
6,153,656 A 11/2000 Bourg
6,159,374 A 12/2000 Hart
6,168,702 B1 1/2001 Varadaraj et al.
6,537,458 B1 3/2003 Polderman
6,555,009 B2 4/2003 Varadaraj
6,843,832 B2 1/2005 Greene et al.
7,452,390 B1 11/2008 Al-Khalifa
8,142,666 B1 3/2012 Happel
8,337,603 B2 12/2012 Akhras et al.
8,426,333 B2 4/2013 Bishop et al.
8,431,508 B2 4/2013 Bishop et al.
8,470,080 B1 6/2013 Ball, IV et al.
9,011,559 B2 4/2015 Corry
9,039,811 B2 5/2015 Eisinger
9,157,035 B1 10/2015 Ball, IV et al.
9,181,499 B2 11/2015 Mason et al.
9,833,727 B1 12/2017 Ball, IV
9,861,910 B2 1/2018 Hammad et al.
10,260,007 B2 4/2019 Barroeta et al.
11,008,521 B1 5/2021 Raynel et al.
11,078,589 B2 * 8/2021 Alghunaimi ............. C25D 5/48
11,148,962 B2 10/2021 Alghunaimi et al.
11,161,058 B2 11/2021 Koleshwar et al.
11,691,093 B2 7/2023 Oshinowo et al.
2002/0185439 A1 12/2002 Wessels
2007/0277967 A1 12/2007 Oserod
2008/0105616 A1 * 5/2008 Allouche ........... B01D 19/0036 210/123
2009/0166028 A1 7/2009 Varadaraj et al.
2009/0321323 A1 12/2009 Sharma et al.
2010/0282694 A1 11/2010 Menchaca Lobato
2012/0255904 A1 10/2012 Nagghappan
2013/0026082 A1 1/2013 Al-Shafei et al.
2013/0104772 A1 5/2013 Schabron et al.
2013/0233786 A1 9/2013 Posa
2015/0152340 A1 6/2015 Cherney et al.
2015/0175904 A1 6/2015 Yeganeh et al.
2015/0225655 A1 8/2015 Adams et al.
2015/0267127 A1 9/2015 Yeganeh et al.
2015/0376033 A1 12/2015 Tao et al.
2017/0174530 A1 * 6/2017 Yin .................... B01D 17/0217
2017/0319984 A1 11/2017 Oshinowo
2018/0066194 A1 3/2018 Soliman et al.
2018/0187095 A1 7/2018 Soliman et al.
2018/0195010 A1 7/2018 Salu et al.
2018/0216016 A1 8/2018 Bakas et al.
2018/0371876 A1 12/2018 Lopez et al.
2019/0100703 A1 4/2019 Koleshwar et al.
2019/0135671 A1 5/2019 Banks et al.
2019/0211274 A1 7/2019 Soliman et al.
2019/0240613 A1 8/2019 Raynel et al.
2019/0247770 A1 8/2019 Oshinowo
2020/0040263 A1 2/2020 Khuzzan et al.
2021/0062355 A1 * 3/2021 Alghunaimi ............. C25D 7/00
2021/0197100 A1 7/2021 Koleshwar
2021/0246051 A1 8/2021 Alghunaimi
2023/0183094 A1 * 6/2023 Alghunaimi .............. C02F 1/40 210/162

FOREIGN PATENT DOCUMENTS

DE 19852204 5/2000
DE 10118443 10/2002
EP 0067300 12/1982
EP 0616823 9/1994
EP 0709120 A1 5/1996
EP 0739858 A2 10/1996
EP 3067102 A1 9/2016
GB 1119699 7/1968
GB 1238251 A 7/1971
WO WO 2000024493 5/2000
WO WO 2004076041 9/2004
WO WO 2018129228 7/2018
WO WO 2018236644 12/2018

OTHER PUBLICATIONS

[No Author Listed], “Petroleum Refinery, Ethylene and Gas Plant Wastewater Treatment Presentation, ” Siemens, 2006, 94 pages.

[No Author Listed], “SAES-A-012, Process Design Criteria for Produced Water Treatment and Disposal,” Saudi Aramco, Apr. 12, 2018, 36 pages.

Ahmed et al., “Saudi Aramco drives technological initiatives for groundwater conservation in oil & gas production facilities,” IPTC 20086, Presented at the International Petroleum Technology Conference, Dhahran, Saudi Arabia, Jan. 13-15, 2020; International Petroleum Technology Conference, 2020, 14 pages.

Bothamley, “Quantifying Oil/water Separation Performance in Three-Phase Separators—Part 1,” Mar. 22, 2017, Mark Bothamley Consulting LLC., 14 pages.

Capps et al., “Reduce oil and grease content in wastewater,” Hydrocarbon Processing, Jun. 1993, 72(6), 1 page (abstract only).

Chen et al., “Novel pore size tuning method for the fabrication of ceramic multi-channel nanofiltration membrane,” Journal of Membrane Science, 2018, 552: 77-85.

Da et al., “Preparation of zirconia nanofiltration membranes through an aqueous sol-gel process modified by glycerol for the treatment of wastewater with high salinity,” Journal of Membrane Science, 2016, 504: 29-39.

Dadari et al., “Crude oil desalter effluent treament using high flux synthetic nanocomposite NF medmbrane-optimization by response surface methodology,” Desalination, Elsevier, Amsterdam, NL, Sep. 2015, 377: 34-46, XP029287214, 13 pages.

en.wikipedia.org [online], “API oil-water separator,” Nov. 2023, retrieved on May 9, 2024, retrieved from URL<https://en.wikipedia.org/wiki/API_oil%E2%80%93water_separator,>, 5 pages.

Guo et al., “Fabrication and characterization of TiO2/ZrO2 ceramic membranes for nanofiltration,” Microporous and Mesoporous Materials, Apr. 2018, 360: 125-131.

Han et al., “A review of the recent advances in design of corrugated plate packs applied for oil-water separation,” Journal of industrial and engineering chemistry, Sep. 2017, 53:37-50, 57 pages.

Kaplan et al., “Assessment of desalination technologies for treatment of a highly saline brine from a potential CO2 storage site,” Desalination, Feb. 2017, 404: 87-101.

Kenawy et al., “Comparative Evaluation between a Modified CFP Separator and All Other Available Oil-Water Separation Techniques,” SPE 46817, Society of Petroleum Engineers, Jun. 1998, SPE International Conference on Health, Safety and Environment in Oil and Gas Exploration and Production held in Caracas, Venezuela, 8 pages.

Kim et al., “Effect of Demulsifier Partitioning on the Destabilization of Water-in-Oil Emulsions, ” Ind. Eng. Chem. Res., 1996, 35: 1141-1149, 9 pages.

Kundua et al., “Treatment and reclamation of hydrocarbon-bearing oily wastewater as a hazardous pollutant by different processes and

(56) References Cited

OTHER PUBLICATIONS technologies: a state-of-the-art review," Reviews in Chemical Engineering, Oct. 2017, 35(1), 37 pages.
Mohamed et al., "Porous membrane modifier as a new trend for deoiling process," Egyptian Petroleum Research Institute, Sep. 2017, 26(3):827-833, 7 pages.
oilngasseparator.info [online], "Horizontal Three Phase Separator Part 2," Aug. 21, 2009, retrieved on May 13, 2024, retrieved from URL<http://www.oilngasseparator.info/oil-handling-surfacefacilities/oil-and-water-separation/horizontal-three-phase-separator-part-2.html>, 4 pages.
ikts.fraunhofer.de [online], "Current Research: NF-Membranes for the cleaning of "Recycle Water" in oil sand extractions," Fraunhofer Department of Nanoporous Membranes, 2019, [retrieved o Dec. 24, 2019], retrieved from: URL <https://www.ikts.fraunhofer.de/en/departments/environmental_process_engineering/nanoporous_membranes/zeolite_membranes_nanocomposites/cr_nf_membranes_for_cleaning.html>, 3 pages.
Roy et al., "Aspen-HYSYS Simulation of Natural Gas Processing Plant," Journal of Chemical Engineering, IEB, Dec. 2011, 26:1, 4 pages.
Said et al., Hydrophobic tungsten oxide-based mesh modified with hexadecanoic branches for efficient oil/water separation, Journal of Water Process Engineering, Oct. 2022, 49(2):102931, 9 pages.
Schei et al., "Transient simulations of gas-oil-water separation plants," Modeling, Identification and Control, 1991, 12: 1 (27-46), 20 pages.
Shariff et al., "Debottlenecking Water-Oil Separation with Increasing Water Flow Rates in Mature Oil Fields," 5th Water Arabia Conference and Exhibition Oct. 17-19, 2017, 26 pages.
siebec.com [online], Deoiling filter—SIEBEC, 2024, retrieved on May 9, 2024, retrieved on URL<https://www.siebec.com/en/products/filter-pump-sets/deoiling-filter/>, 2 pages.
Sivalls et al., "Oil and Gas Separation Design Manual," Section: 300, Technical Bulletin, Feb. 10, 2009, 142:7, 63 pages.
Song et al., "TiO2 nanofiltration membranes prepared by molecular layer deposition for water purification," Journal of Membrane Science, Jul. 2016, 510: 72-78.
Tanudjaja, et al., "Membrane-Based Separation for Oily Wastewater: A Practical Perspective," Water Res., Jun. 2019, 1:156:347-365, 65 pages.
Trofaier et al., "Optimizing Separation Efficiency of Produced Water Tanks by Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.
Veoliawatertechnologies.com [online], "OPUS® Technology: Overview," Veolia Products Listing, 2019, [retrieved on Dec. 24, 2019], retrieved from: URL <https://www.veoliawatertechnologies.com/en/solutions/products/opus-technology>, 4 pages.
Wu et al., "Effect of Demulsifier Properties on Destabilization of Water-in-Oil Emulsion," May 2003, Energy & Fuels, 2003, 17: 1554-1559, 6 pages.
Xu et al., "Design aspects of (super)hydrophobic mesh based oil-collecting device with improved efficiency." SN Applied Sciences, Jan. 2021, 3:135, 8 pages.
Xu et al., "Fabrication of Durable Superhydrophobic Stainless Steel Mesh with Nano/Micro Flower-Like Morphologies for Self-Cleaning and Efficient Oil/Water Separation," J Bionic Eng., Jul. 2022, 19:1615-1624, 10 pages.
Yue et al., "Superhydrophobic Stainless-Steel Mesh with Excellent Electrothermal Properties for Efficient Separation of Highly Viscous Water-in-Crude Oil Emulsions," Ind. Eng. Chem. Res., Sep. 2020, 59(40):17918-17926, 29 pages.
Zeidler et al., "Preparation and Characterization of New Low MWCO Ceramic Nanofiltration Membranes for Organic Solvents," Journal of Membrane Science, 2014, 470: 421-430.
Zeidler et al., "New Ceramic Membranes for Organic Solvent Nanofiltration with a Molecular Weight Cut-Off < 500 Da," Procedia Engineering, Jan. 2012, 44: 646-648.
International Search Report and Written Opinion in International Appln. No. PCT/US2024/046012, mailed on Nov. 5, 2024, 17 pages.

* cited by examiner 218
122
310
216
120
202

308
224
204
222
214
306
304
302
102

WATER OIL SEPARATOR VESSEL WITH HYDROPHOBIC MESH TUBES

TECHNICAL FIELD

The present disclosure is directed to separating emulsified oil from produced water.

BACKGROUND

The production of crude oil often produces entrained water, termed a water-cut. As reservoirs age, the water-cut increases. Generally, the entrained water is separated from the oil, and treated in a water oil separator vessel (WOSEP) to separate dispersed oily materials (emulsified oil) from the produced water, so that it may be disposed, for example, by being injected into disposal wells or used for other applications. The basic design of the WOSEP was intended to manage water-cuts less than 10%.

However, as an oil field matures, oil production decreases while water production increases. The current water/oil ratio is estimated at 2:1 to 3:1 worldwide, converting to a water cut of 50% to 75% of the total amount of produced fluids. An increase water production rate and a higher water-cut causes a significant reduction of separation efficiency of removing oil from the water in a WOSEP, as the water requires more retention time for separation. An extreme volume of water can exceed the processing capacity of the WOSEP, resulting in incomplete oil water separation. This leads to poor quality, or off-spec, water being provided to injection wells.

SUMMARY

An embodiment described herein provides a water-oil separation plant (WOSEP). The WOSEP includes a gravity separation vessel, an inlet for an oil-in-water emulsion, an oil outlet for separated oil, a water compartment in the gravity separation vessel, and a water outlet from water compartment for separated water. A tube of hydrophobic mesh with an axis perpendicular to the water surface is disposed in the water compartment, wherein the top of the tube is above the water surface, and the bottom of the tube is below the water surface. An outlet coupled to the bottom of the tube allows oil and water to drain from the tube.

Another embodiment described herein provides a method for separating an oil-in-water emulsion in a water oil separator vessel (WOSEP). The method includes flowing the oil-in-water emulsion into a separation compartment of the WOSEP, performing a gravity separation of a portion of the oil from the water in the separation compartment, and flowing separated water into a water compartment including a tube made from a hydrophobic mesh. Oily water that flows through the tube is collected through an outlet and separated water from the water compartment is removed through a water outlet.

Another embodiment described herein provides a tube in a water compartment of a water oil separator vessel (WOSEP). The tube includes a hydrophobic mesh that separates oil from water in the water compartment.

DETAILED DESCRIPTION

An apparatus and method to remove contaminant oil from produced water using a hydrophobic mesh material in a pressurized water-oil separator vessel (WOSEP) is described in examples herein. Produced water is the water associated with the production of crude oil. Oil is usually present in the produced water as dispersed oil-in-water or an oil-in-water emulsion. In the apparatus, an assembly of tubes made from the hydrophobic mesh material is positioned in a water surge portion of the water-oil separator vessel downstream of a weir. The axes of the tubes are disposed perpendicular to and crossing the surface of the oily water. Oil flows into the tubes through the hydrophobic mesh material while the water is substantially repelled.

The lower end of each of the tubes is connected to a collection manifold. The top of the tube is disposed above the liquid surface. The collection manifold combines the fluid that passes through the hydrophobic mesh, which is predominantly oil, for removal from the separator vessel. The vertical tube configuration allows for continuous separation of the oily layer floating on the water surface while the water level varies. The vessel pressure is greater than atmospheric pressure and this is the driving force to cause the flow of the oil through the collection manifold and out of the vessel.

Figure 1:
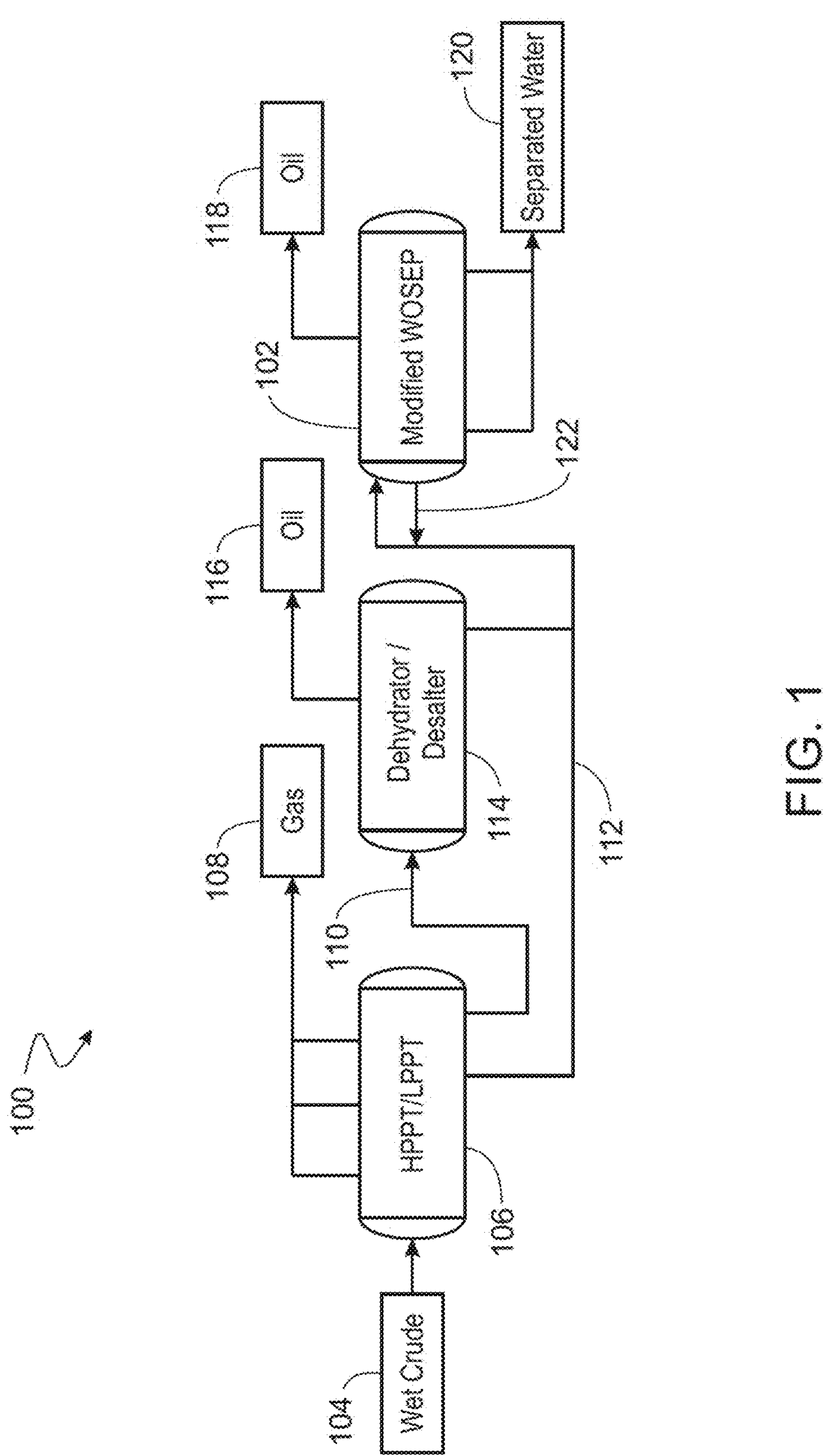
FIG. 1 is a schematic diagram of a hydrocarbon/water separation process (HWSP) using a modified WOSEP.

FIG. 1 is a schematic diagram of a hydrocarbon/water separation process (HWSP) 100 using a modified WOSEP 102. The HWSP 100 starts with the introduction of wet crude oil 104 into a high-pressure production trap/low-pressure production trap (HPPT/LPPT) vessel 106. The HPPT/LPPT vessel 106 performs a separation of gas 108 from the wet crude oil 104, and produces two output streams, a crude oil stream 110, and a produced water or oil-in-water emulsion stream 112.

The crude oil stream 110 is provided to a dehydrator/desalter 114 that removes salt and water from the crude oil stream 110, providing an oil 116 that is substantially dehydrated. The oil 116 is provided to other vessels and refinery for further processing. The dehydrator/desalter 114 also produces an oil-in-water emulsion stream 112, which is combined with the oil-in-water emulsion stream 112 from the HPPT/LPPT vessel 106 and provided as a feed to the modified WOSEP 102 described herein.

The modified WOSEP 102 separates the oil-in-water emulsion by gravity separation, creating separated oil 118 and separated water 120 that can be reused, for example, being provided to an injection well. The separation is controlled by several factors. The size of the oil droplets has a substantial influence on the separation efficiency. The bigger the droplet size, the faster the coalescence. In many cases, the oil droplet sizes entering the WOSEP vary between about 10 and about 100 μm or larger. Further, the flow rates and residence time for water in the WOSEP 102 is importance to control the separation of crude oil. Thus, depending on the residence time, smaller oil droplets may be poorly separated or not separated at all in the gravity separation process, resulting in some oil contamination of the separated water.

As described herein, the modified WOSEP 102 uses tubes made from a hydrophobic mesh material to polish the separated water 120 after the gravity separation, further separating oil from the water. The oil is removed from the tubes through a manifold, and the resulting oily water stream 122 may be recycled to the inlet of the HPPT or LPPT.

Figure 2:
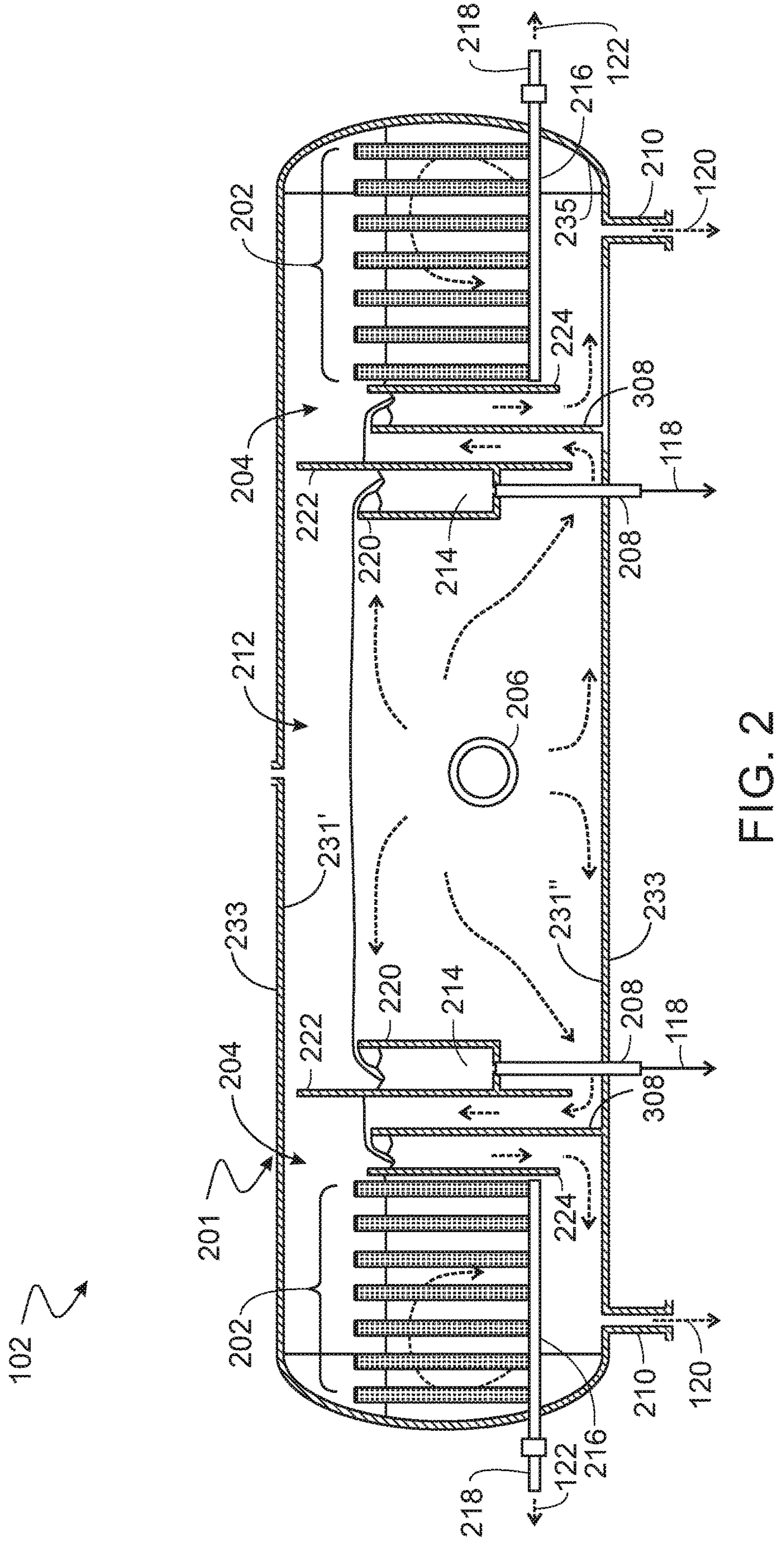
FIG. 2 is a drawing of a WOSEP that includes tubes formed from hydrophobic mesh and disposed in the water compartments to polish the separated water.

FIG. 2 is a drawing of a WOSEP 102 that includes tubes 202 formed from hydrophobic mesh and disposed in the water compartments 204 to polish the separated water. Like numbered items are as described with respect to FIG. 1. As previously stated, the WOSEP 102 may include a gravity separation vessel 201, which may include a separation compartment 212 and a water compartment 204 therein. As clearly illustrated in FIG. 2, the gravity separation vessel 201 may comprise an exterior 231 and an interior 233. The interior has a top internal surface 233' and a bottom internal surface 233". As clearly shown, the gravity separation vessel 201 may also have a sidewall 235 connecting the top internal surface 233' and the bottom internal surface 233" The treatment of produced water is well-established in the crude oil production industry, with known concentration and droplet cut-off sizes for a gravity settler, such as the WOSEP 102. Typical American Petroleum Institute water-oil separators achieve an outlet oil-in-water concentration of 50 to 100 ppm. These water-oil separators often use coalescing plates to increase the dispersed oil droplet sizes and promote faster rise velocities which increases the total separation from the bulk water.

The WOSEP 102 may be configured based on the amount of oil in water to be separated, for example, with variations in vessel inner diameter (ID) and T/T length (the distance from the tangent line on one head to the tangent line on the opposite head). However, the internal arrangement is the same, and the tubes 202 may be used in any of these variations. Further, in various embodiments the tubes 202 are used in other gravity separation systems, such as separators having a single water compartment.

The WOSEP 102 has one inlet 206 for the oil-in-water emulsion and two oil outlets 208. The oil outlets 208 may come out the bottom or the side of the WOSEP 102, or the separated oil 118 may be combined in a manifold with a single outlet 208 from the WOSEP 102. The separated water 120 is removed from each of the water compartments 204 through a water outlet 210.

The water-oil separator (WOSEP) vessel consists of a separation compartment 212 in which oil contaminating the water is allowed to flow to the surface and is skimmed from the produced water into an oil collector 214. The produced water continues into the water compartment 204 that acts as a surge control for the downstream systems used for water disposal, such as injection pumps. Any contaminant oil not removed from the produced water in the separation compartment flows with the produced water into the water compartment 204.

In various embodiments, the length to diameter (L/D) ratio of the WOSEP 102 is between about 10.9 and about 13.5. The ratio of the length of the separation compartment 212 to the length of the WOSEP 102 (S/L) is between about 0.54 and about 0.79. The ratio of the length of the water compartment 204 to the length of the WOSEP 102 is between about 0.21 and about 0.46.

In the water compartment 204, oil floats to the top of the water surface and can pass through the hydrophobic mesh of the tubes 202. In various embodiments, the bottom of each of the tubes 202 is coupled to an oil collection manifold 216 that allows the removal of the oil through an oily water outlet 218 as the oily water stream 122. This is discussed further with respect to FIG. 3.

The secondary removal of oil in the water compartment 204 by the tubes 202 significantly reduces the oil accumulation resulting in a lower oil-in-water concentration at the water outlet 210. Further, the use of the tubes 202 allows an increase in feed throughput, which effectively increases the capacity of the WOSEP 102 by allowing secondary removal of any oil not removed in the separation compartment 212.

The use of the tubes 202 reduces or eliminates a significant issue with the WOSEP 102, by removing dispersed contaminant oil droplets from the separated water 120. The oil concentration in the oil-in-water emulsion stream 112 (FIG. 1) is dispersed or diluted, generally at concentrations up to 1% or 10,000 ppmv (parts per million by volume) oil and grease in water. The function of the WOSEP 102 is to reduce the oil concentration to below 100 ppm in the separated water 120. In the WOSEP 102, the oil is separated by skimming from the surface of the water in the separation compartment 212. The separation has no active controls to adjust the oil removal rate in response to changing feed conditions, such as the flow rate or the oil-in-water concentration. The separation of the oil from water requires that oil droplets rise or float to the surface of the water, the liquid level, in the WOSEP 102. The liquid level is maintained by the water weir 220 that sits just below the level of the top of the oil collector where the oil is skimmed off the surface of the water.

Without the use of the tubes 202, effective separation is achieved if the flow rate is stable at or below the rated capacity and the concentration of the oil in the water is relatively constant at about 1000 ppm or below. When the inlet feed flow rate fluctuates rapidly, or surges, or if the oil concentration fluctuates rapidly, the oil separation degrades and oil by-passes the separation compartment underflowing the oil baffle 222 into the water compartment 204 and out of the WOSEP 102 with the separated water 120.

The use of the tubes 202 increases the de-oiling performance in the primary/first stage produced water separators, specifically in the water-oil separator vessel with a weir dividing the vessel into a separation compartment 212 and a water compartment 204. Oil not separated in the separation compartment 212 is normally lost to the water compartment 204. Tubes 202 made from a hydrophobic mesh further separate the oily layer floating on the water surface in the water compartment 204 using a continuous vertical surface to remove the oil from the WOSEP 102. Accordingly, embodiments described herein allow for the separation of oil that would not be separated in the separation compartment 212 without the tubes 202, and which would be lost with the separated water 120 removed through the water outlet 210 to the disposal wells, or sewers. Thus, the techniques enable the recovery of the oil, preventing product loss, reducing contamination of the environment, and lowering the risk and the economic cost of disposal well plugging and damage.

Figure 3:
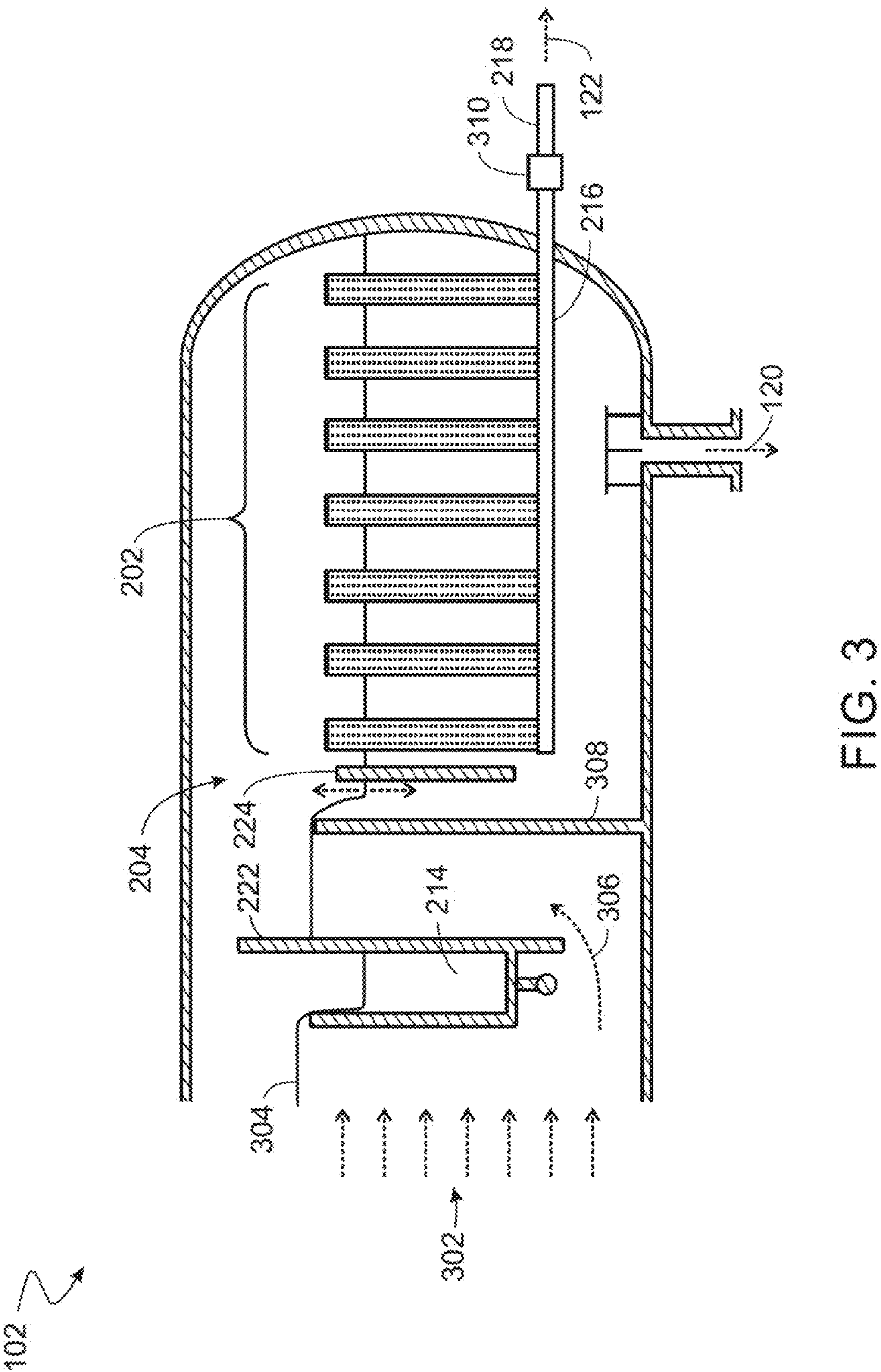
FIG. 3 is a schematic drawing of the tubes in the water compartment of the WOSEP.

FIG. 3 is a schematic drawing of the tubes 202 in the water compartment of the WOSEP 102. The oily produced water 302 from the upstream multiphase (gas-oil-water) or crude dehydration vessel enters the WOSEP 102 through the inlet 206 (FIG. 2) and passes through an inlet distributor into the separation compartment 212. As used herein, the inlet distributor can be a slotted or perforated pipe, an inlet-vane device, an inlet box distributor, or other feed inlet distributor The oil 304 floats to the surface and is skimmed off into the oil collector 214. The separated oil 118, which is contaminated with water, is returned to an upstream gas-liquid separation vessel, such as HPPT/LPPT vessel 106. The treated water 306 continues under the oil baffle 222 and over the water weir 308 into the water compartment 204. The water level is controlled in the water compartments by adjusting the valve on the outlet of the separated water 120 to feed the downstream pumps. With a variable inlet flow to the WOSEP 102, the level in the water compartment will vary causing the suction pressure on the downstream pump to vary.

When the tubes 202 are not used, multiple skim nozzles are placed at different elevations in the water compartment 204. The skim nozzles are manually operated to remove accumulated oil floating in the surge compartment to the sewer and to divert the oil from the separated water outlet 120. The treated produced water carries on to the disposal or injection pumps. Generally, without using the tubes 202, the WOSEP 102 is designed for an inlet water quality of about 1000 ppm of oil and grease and up to a maximum of 2500 ppm of oil and grease during upset conditions, and an outlet water quality of 100 ppm oil-in-water.

The use of the tubes 202 improves the separation and increases the tolerance of the system to upsets. The tubes 202 separates the light liquid phase, the dispersed oil, from the heavy phase, which is the water phase. The separation works in the non-modified WOSEP up to 10 vol. % of the light phase in the heavy phase. Further, the tubes 202 improve the separation in the WOSEP 102 during upset conditions, for example, when the oil concentration in the inlet feed surges due to an upset condition in the upstream separator vessel sending a higher concentration of oil-in-water produced water to the WOSEP 102.

In addition to the tubes 202, embodiments include instrumentation to verify separation performance and the oil-in-water concentration in the treated produced water. An oil-in-water analyzer in the water compartment 204 detects the oil concentration in the water compartment and activates a valve 310, such as a solenoid valve, to recycle collected oil to the upstream oil separators. The valve 310 may be used along with a check valve to prevent reverse flow back into the WOSEP 102.

The instrumentation can include optical detectors for identifying and counting oil droplets in the oil-in-water emulsion, ultrasonic detectors, and the like. For example, oil-in-water analyzers can measure the oil-in-water concentration in the oily water stream 122 or separated water out 120, using ultraviolet fluorescence spectroscopy or infrared spectroscopy. Mass flow meters and densitometers on the oily water stream 122 can be used to measure the flow rate and density to determine the oil recovery and control the oily water return rate to the upstream process. Phase profilers installed in the separation and water compartments can be used to measure the vertical distribution of gas, oil, and water in real-time with electrical tomography or nucleonic level density measurement. For example, units available from Rocsole (electrical tomography profiler) or Tracerco (scattered γ-radiation detection) can detect and measure the thickness of the oil layer. This enables the control of the oily water removal rates. Further, the profilers monitor the location of the oily layer in the water compartment during level variations due to inlet flow variability and level control in the water compartment.

The oil-in-water sensor, in combination with the oil layer thickness, would allow control of the de-oiling process as the oil-in-water sensor in the stream 122 detects if the oil-in-water is low and the layer is thin, indicating that the water has been treated effectively by skimming in the separation compartment. As the oily layer increases, the oil-in-water sensor can be controlled to a value, allow the oil layer thickness to vary. In some embodiments, the oily layer thickness is controlled to a set thickness and the flow rate of the oily water stream 122 is controlled. The oil-in-water sensor in combination with the profiler can also detect mesh tube separation efficiency. For a lower separation efficiency, the oil-in-water concentration will decrease for an equivalent oily layer thickness as more water is removed with the oil through stream 122. In this example, the profiler in combination with the oil-in-water sensor on 122 would provide control on the oil recovery from the WOSEP water compartment.

During use, the tubes 202 may get fouled or clogged from thicker, high-viscosity oils or from solid particle buildup. In some embodiments, a steam stream or a gas stream is used to backwash and flush the mesh tubes of blockages.

Any number of materials can be used for the hydrophobic mesh of the tubes 202. In some embodiments, the hydrophobic mesh is a stainless-steel copper-coated mesh. The hydrophobic mesh of the tubes 202 will allow dispersed or accumulated oil in the water compartment 204 of the WOSEP 102 to pass through. Generally, the water phase will be repelled, although some small amount may come through.

In some embodiments, the hydrophobic mesh is prepared by sonicating a stainless-steel mesh in a solution of acetone and ethanol, and then electroplating the stainless-steel mesh in a copper solution to form a copper coating on the surface of the stainless-steel mesh. The copper-coated stainless-steel mesh is treated with an oxidizing solution while an oxidizing potential is applied. The mesh is then washed with water and dried. The copper-coated stainless-steel mesh is immersed in a lauric acid solution. The mesh is then rinsed with ethanol to remove adsorbed lauric acid. After drying, the copper-coated stainless-steel hydrophobic mesh is functionalized with hydrophobic branches of lauric acid. Other long chain fatty acids may be used in addition to or in place of lauric acid, such as capric acid, myristic acid, stearic acid, and the like.

In some embodiments, the hydrophobic mesh is prepared by immersing a stainless-steel mesh in a caustic solution at about 50° C. to about 60° C. The stainless-steel mesh is then rinsed with de-ionized water and air-dried. After drying, the stainless-steel mesh is treated by dipping in a nano-scale hydrophobic coating solution. The stainless-steel mesh is removed from the dip and air-dried.

The use of the tubes 202 enhances the separation of oil from water in a WOSEP 102 where the inlet oil concentration is of the order of about 0.01% to about 10% oil dispersed in the bulk water flow. This augments the flow conditions required for optimal separation of the oil from water. The augmentation improves the oil removal capacity for the WOSEP 102, and other oil-in-water separation systems that are gravity-based. These systems are used in numerous hydrocarbon installations for the recovery of contaminant oil from produced water streams.

Figure 4:
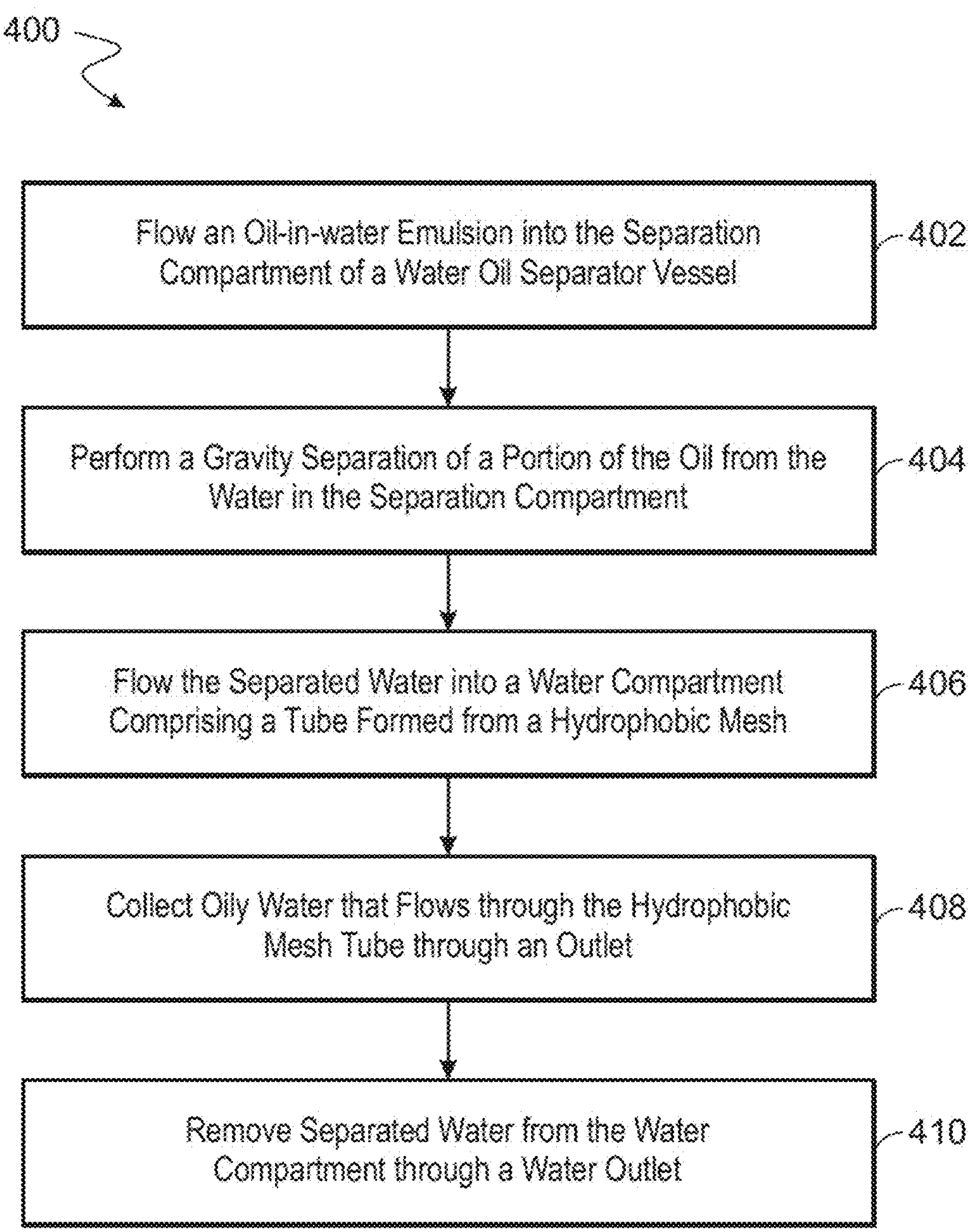
FIG. 4 is a method for using tubes made from a hydrophobic mesh to polish separated water in a water oil separator vessel.

FIG. 4 is a method 400 for using tubes made from a hydrophobic mesh to polish separated water in a water oil separator vessel. The method begins at block 402, when and oil-in-water emulsion is flowed into the separation compartment of a water oil separator vessel, such as a WOSEP. At block 404 a gravity separation of a portion of the oil from the water is performed in the separation compartment of the WOSEP.

At block 406, the separated water is flowed into a water compartment comprising a tube formed from a hydrophobic mesh. At block 408, oily water that flows through the hydrophobic mesh tube is collected through an outlet. At block 410, separated water from the water compartment is removed through a water outlet.

EXAMPLES

Figure 5A:
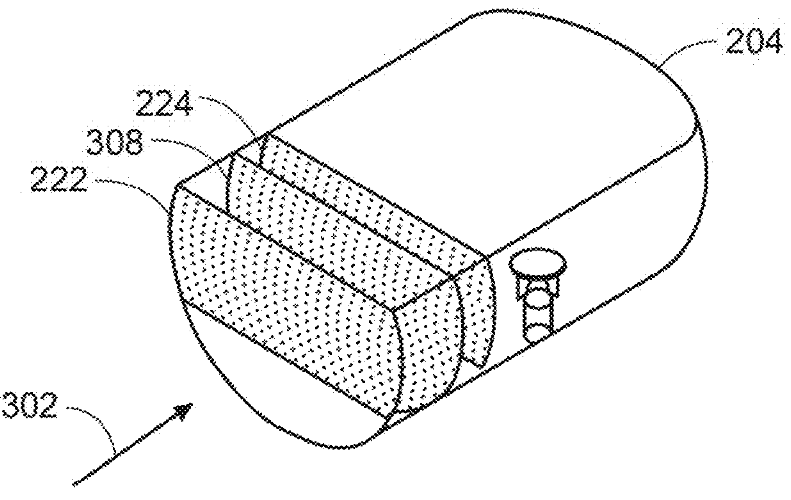
FIGS. 5A and 5B are perspective views of the water compartment showing the inclusion of an array of the tubes made from the hydrophobic mesh.
Figure 5B:
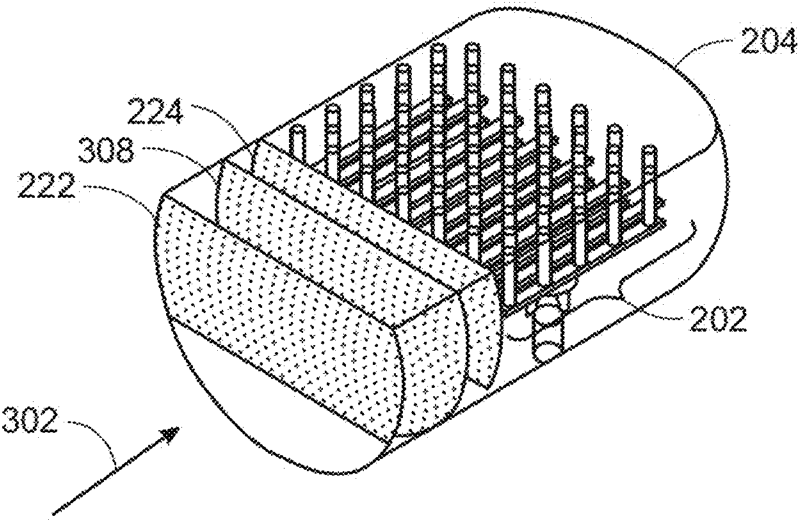
Figure 6:
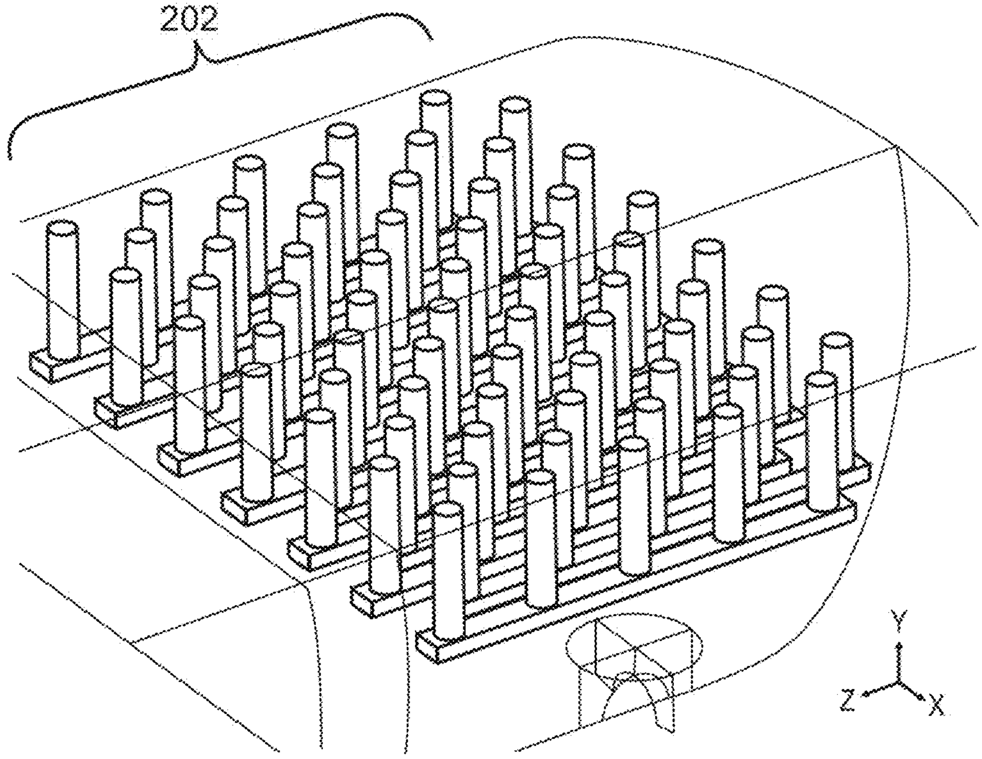
FIG. 6 is a cutaway view showing the tubes made from the hydrophobic mesh.

To compare the performance of a WOSEP 102 using the tubes made of the hydrophobic mesh with an existing WOSEP configuration, a model of the water compartment 204 with the tubes 202 made from the hydrophobic mesh was built. The arrangement of the tubes 202 is shown in FIGS. 5A and 5B and FIG. 6. Like numbered items are as described with respect to previous figures.

FIGS. 5A and 5B are perspective views of the water compartment showing the inclusion of an array of the tubes made from the hydrophobic mesh. Both views show the oil baffle 222, water weir 308, and water baffle 224. FIG. 5A is a perspective view of the water compartment of an unmodified WOSEP. FIG. 5B is the Modified WOSEP water compartment with the Invention and with the oil baffle 222, water weir 308 and water baffle 224.

FIG. 6 is a cutaway view showing the tubes 202 made from the hydrophobic mesh. The tubes 202 are formed into a uniformly spaced, 60° staggered hydrophobic mesh tube assembly which is mounted in the water compartment 204 of the WOSEP 102 with an oil collection manifold 216 coupling the bottom of the tubes to an oily water outlet 218. This configuration was used for the model, giving the results below. In this view, the liquid level is coincident with the top of the tubes 202 as the bulk water domain was modeled without consideration of the gas phase in the freeboard. The tubes 202 will straddle the liquid level is illustrated in FIGS. 2 and 3.

The tubes can be placed in other configurations to adjust the de-oiling performance, for example, based on ease of manufacturing, oil-in-water content, and the like. These include, for example, a uniform square array, a non-uniform (x>y and x<y) square and staggered array, a random arrangement of tubes, or tubes arranged in a phyllotaxis pattern. Other possible embodiments include 450 or other X° staggered 900 square, non-uniformly spaced in x, or non-uniformly spaced in y.

Phyllotaxis is the study of the arrangements or patterns of leaves or flowers on a plant stem occurring in nature. For leaves, the patterns evolved to ensure each leaf receives a maximum amount of direct sunlight and precipitation at the leaf bud base without substantial direct obstruction or overlap from other leaves or branches. In embodiments described herein, the patterns used for placement of the tubes in the array of tubes is based on phyllotaxis to improve the efficiency of flow around the tubes, increasing the do-oiling performance. Different phyllotaxis patterns with different C values or handedness with a plane of symmetry in the pattern through the middle of the WOSEP vessel can be used. The pattern causes the fluid in the separation chamber to move in a non-linear direction. This improves the contact of the oily water with the tubes, for example, over a square array of tubes.

Computational Fluid Dynamics (CFD) Modeling

The WOSEP was modeled using Computation Fluid Dynamics (CFD) to determine the current hydrodynamics and oil separation and to evaluate the invention. Computational Fluid Dynamics (CFD) once used as a tool to understand the behavior of horizontal gravity multiphase separators and for use in separator design and in retrofit studies. CFD is used across many industries and the has been validated for many different types of flows including multiphase flows.

CFD Methodology

A Eulerian-Eulerian multiphase model was used to predict the characteristics of the multiphase dispersion encountered in the WOSEP. The liquid-dispersions of oil found in WOSEPs can be characterized as very dilute to dense with the volume fraction of oil ranging from near zero at the bottom of the vessel to 100% in the oil film at the water surface. Since the water level varies with flow rate, the liquid level is not known a priori, and the blanket gas layer is modeled as well. The water phase is the primary Euler phase while the gas and oil phases are considered secondary phases. The volume fraction equation is solved implicitly as is appropriate for steady-state flows where the final solution is not influenced significantly by the initial conditions of flow and were there are separate inflow boundaries for water, oil, and gas. The oil droplet is modeled with a uniform diameter. The conservation equations are derived by ensemble averaging the local instantaneous balance for each phase. The continuity equation for phase j is $$\frac{\partial}{\partial t}(\alpha_j \rho_j) + \nabla \cdot (\alpha_j \rho_j \vec{v}_j) = 0 \tag{1}$$

where $\alpha_j$, $\rho_j$ and $\vec{v}_j$ are the phase volume fraction, density, and velocity, and $\dot{m}$ is the mass transferred between phases. The momentum balance for phase j is $$\frac{\partial}{\partial t}(\alpha_j \rho_j \vec{v}_j) + \nabla \cdot (\alpha_j \rho_j \vec{v}_j \vec{v}_j) = -\alpha_j \nabla p + \nabla \cdot \alpha_j \mu_j \left[ \left( \nabla \vec{v}_j + \nabla \vec{v}_j^{\,T} \right) - \frac{2}{3} \nabla \cdot \vec{v}_j \bar{I} \right] + \sum_{i=1}^{n} \left( K_{ij} (\vec{v}_i - \vec{v}_j) \right) + \alpha_j \rho_j \vec{g} \tag{2}$$

where p is pressure, μ is viscosity, $\bar{I}$ is the unit tensor, and $K_{ij}(=K_{ji})$ is the mean interphase momentum exchange coefficient and can be written in general form as:

$$K_{ij} = \frac{\alpha_i \alpha_j \rho_j f}{\tau_i} \tag{3}$$

The terms $f$ and $\tau_i$ are the drag function and particle relaxation time, respectively, expressed as $$f = \frac{C_D Re}{24} \tag{4}$$

and, $$\tau_i = \frac{\rho_j d_j^2}{18\mu_m} \tag{5}$$

where $d_j$ is the Sauter mean diameter coupling the momentum equations to the population balance equation. For settling or rising droplets, the drag originates from viscous surface shear and the pressure distribution, or form drag, around the droplet. For dilute dispersions, the droplets can settle or rise without interacting with neighbor droplets. For small droplets in the viscous regime, the Stokes law determines the terminal velocity in dilute or unhindered conditions. The Schiller-Naumann correlation for drag coefficient $C_D$ is used here. Drag and buoyancy forces are the only forces modeled on the oil droplets. Additional forces like lift forces, virtual mass forces, and turbulent dispersion forces are assumed to be negligible given the small droplet size, which is on the order of 150 μm or less, and the dilute concentrations in the bulk of the vessel, which is less than 1000 ppm. The oil droplet diameter is an input parameter for the multiphase modeling to determine the separation efficiency of the WOSEP. Different droplet sizes were investigated, including 10 μm, 50 μm, 100 μm, and 150 μm. The WOSEP is expected to remove droplets greater than 150 μm. The dispersion and distribution of oil droplets in the produced water is dominated by the turbulence in the bulk water phase. The turbulent flow field is modeled with the Realizable k-ε turbulence model with scalable wall functions (ANSYS Inc., 2016).

Boundary Conditions

The inlet boundary condition was either a velocity inlet or mass flow inlet boundary condition. The inlet oil-in-water concentration is an input parameter. The influence of the inlet oil-in-water concentration on separation performance was investigated. Different values of inlet oil-in-water concentration were investigated, including 100 ppm, 500 ppm, 1000 ppm, and 2500 ppm. The outlet pressure boundary condition is applied on the oil and the water outlet boundaries. The hydrophobic mesh is described as a porous media with a different permeability for the oil and water phases depending on the mesh density and hydrophobicity of the mesh. The pressure values for the water and oil boundaries depend on the hydrostatic pressure in the oil collector/bucket and in the water compartment.

Numerics

The solution methods employed for the governing equations are the phase-coupled SIMPLE for pressure-velocity coupling, second-order upwind discretization for momentum and turbulence, QUICK discretization for the volume fraction equation. The solution is initialized with a zero-velocity field and an idealized phase distribution—gas in the freeboard, inlet oil fraction in the water phase. The pseudo-transient solver was used with a time-scale factor of 1. All equations were considered converged when all residuals are below 1e-4. All cases were modeled using the commercially available CFD code ANSYS FLUENT™ (ANSYS Inc., 2016).

Results for modeling oil and water flows with tubes of hydrophobic mesh.

Figure 7A:
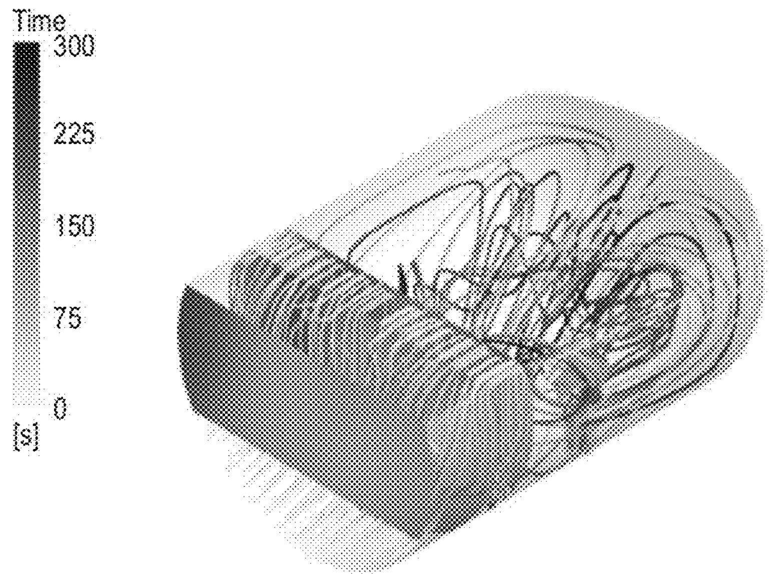
FIGS. 7A and 7B are perspective views of the flow patterns of oil and water in the water compartment before and after the inclusion of the hydrophobic mesh tubes.
Figure 7B:
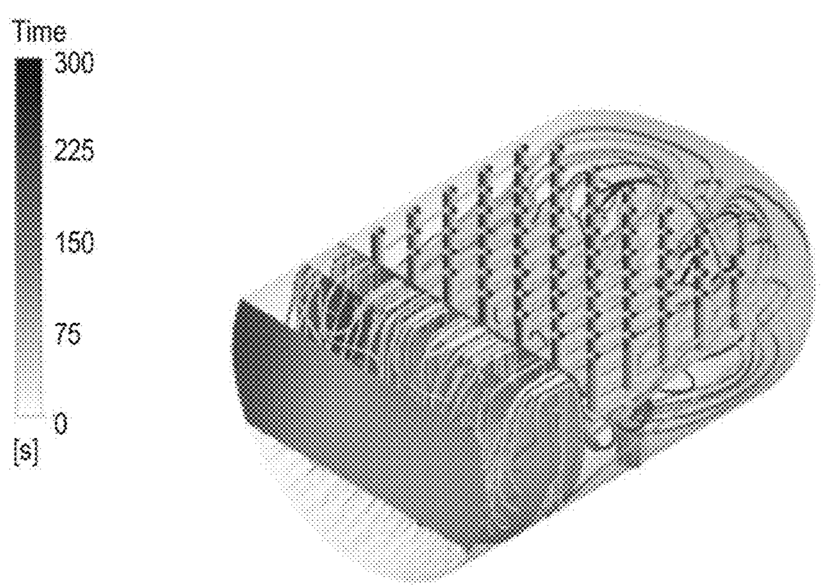

FIGS. 7A and 7B are perspective views of the flow patterns of oil and water in the water compartment before and after the inclusion of the hydrophobic mesh tubes. FIG. 7A is a drawing of modelled streamlines illustrating a flow pattern in the water compartment without the use of the tubes. FIG. 7B is a drawing of modelled streamlines illustrating a flow pattern in the water compartment with the use of the tubes. As can be seen in these illustrations, the treated water circulates in the water compartment from lower elevation to upper elevation near the water level (free-surface; liquid level) bringing the water to the hydrophobic mesh tube assembly for oily water removal.

Figure 8A:
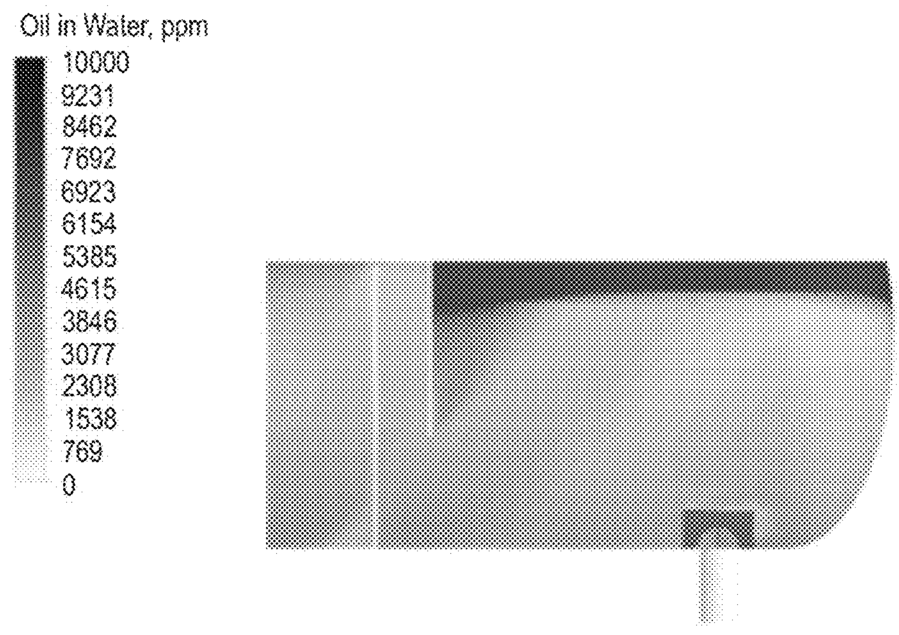
FIGS. 8A and 8B are side cross-section views of the concentration of oil in the water in the water compartment before and after the inclusion of the hydrophobic mesh tubes.
Figure 8B:
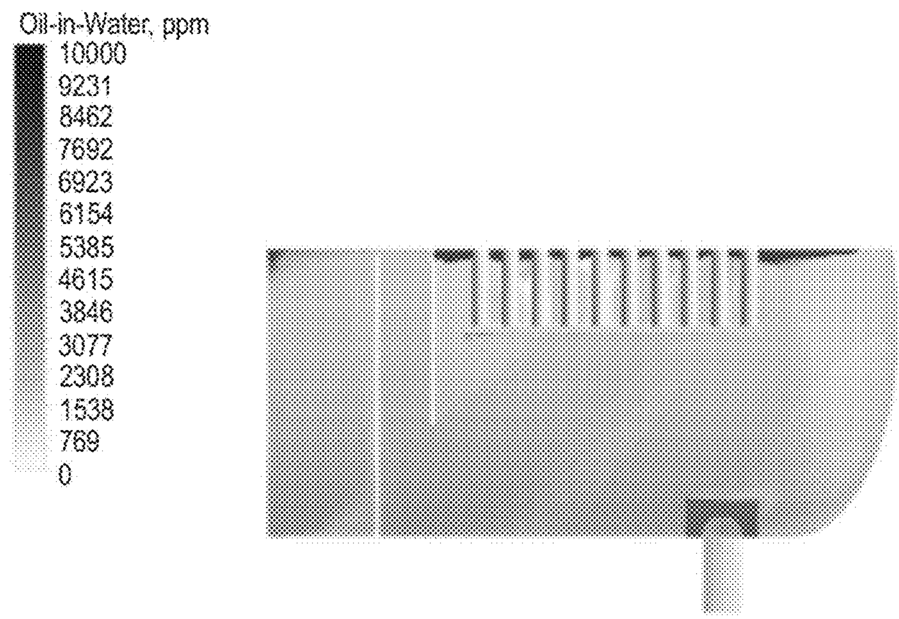

FIGS. 8A and 8B are side cross-section views of the concentration of oil in the water in the water compartment before and after the inclusion of the hydrophobic mesh tubes. FIG. 8A is a drawing of the modelled distribution of oil in the mid-plane of the water compartment without tubes. As shown in FIG. 8A, the oil is a thick oily layer is on the water surface as indicated by the oil concentration in excess of 10000 ppm (1% oil in water).

FIG. 8B is a drawing of the distribution of oil in the mid-plane of the water compartment with the tubes. As shown in FIG. 8B, there is a much thinner oil layer due to the oil removal by the tubes. The tubes may not remove all oil, as the flow pattern in the water compartment may allow some oil to by-pass the hydrophobic mesh tubes and exit the separator through the water outlet at the bottom of the vessel. It can be noted that the 60° deg staggered/triangular array removes more oil than a 90-deg square array.

Figure 9A:
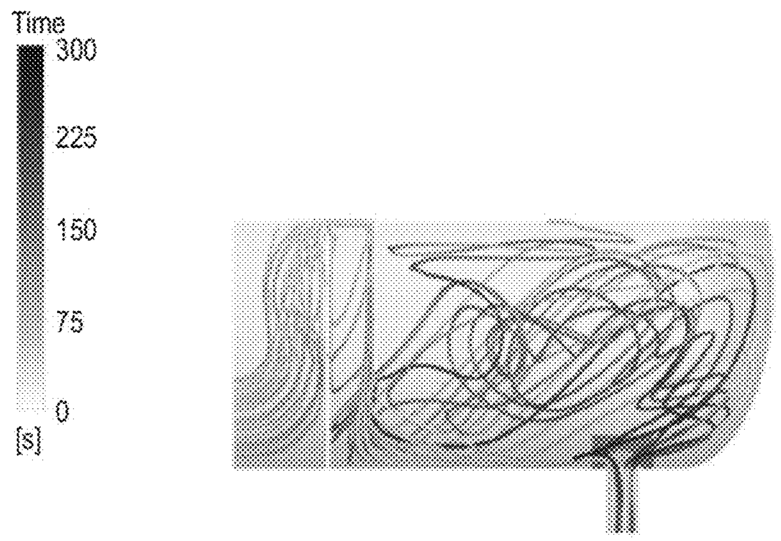
FIGS. 9A and 9B are side cross-section views of the flow patterns of oil and water in the water compartment before and after the inclusion of the hydrophobic mesh tubes.
Figure 9B:
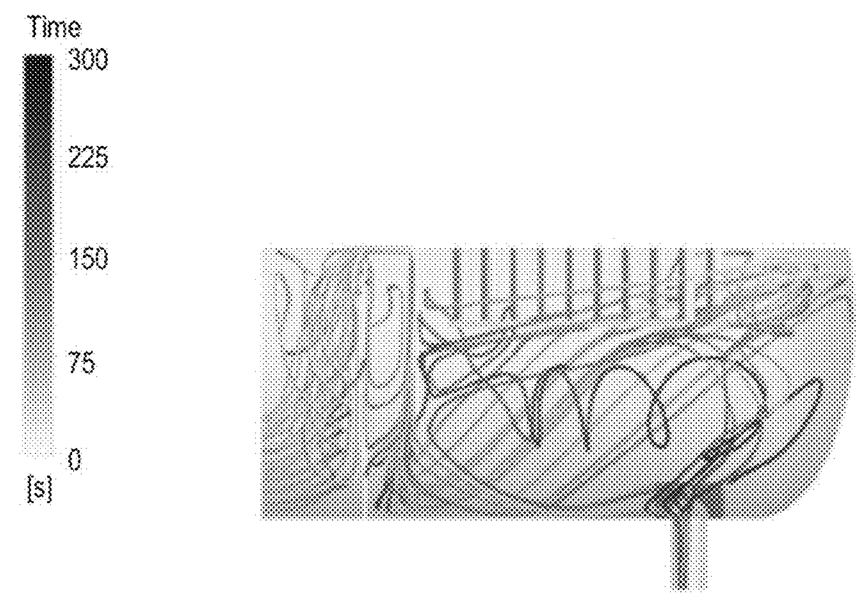

FIGS. 9A and 9B are side cross-section views of the flow patterns of oil and water in the water compartment before and after the inclusion of the hydrophobic mesh tubes. FIG. 9A is a drawing of modelled streamlines illustrating a flow pattern in the water compartment without the use of the tubes. The flow under the water baffle causes a recirculation zone up to the water level bringing oil up to the free surface.

FIG. 9B is a drawing of modelled streamlines illustrating a flow pattern in the water compartment with the use of the tubes. The flow under the water baffle causes a recirculation zone up to the water level bringing oil up to the free surface for removal by the hydrophobic mesh tube assembly.

Figure 10A:
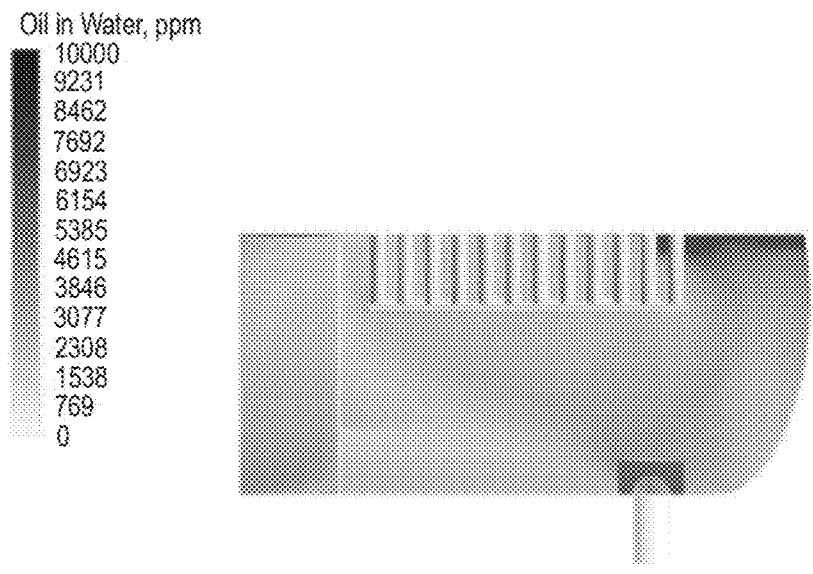
FIGS. 10A and 10B are side cross-section views of the concentration of oil and water in two implementations.
Figure 10B:
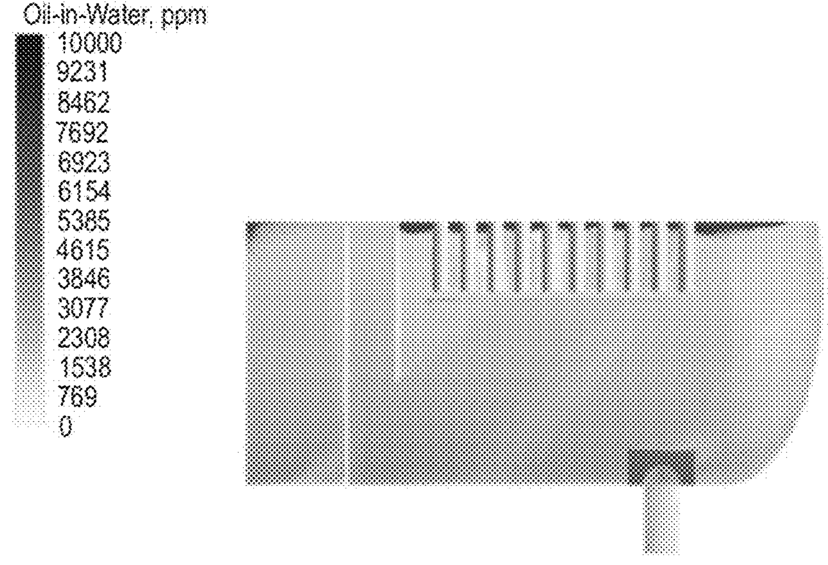

FIGS. 10A and 10B are side cross-section views of the concentration of oil and water in the two implementations. FIG. 10A is a drawing of the concentration of oil in the water compartment with no water baffle and the tubes. The oil accumulates at the water level towards the vessel wall having flowed past the hydrophobic mesh tube assembly.

Figure 11A:
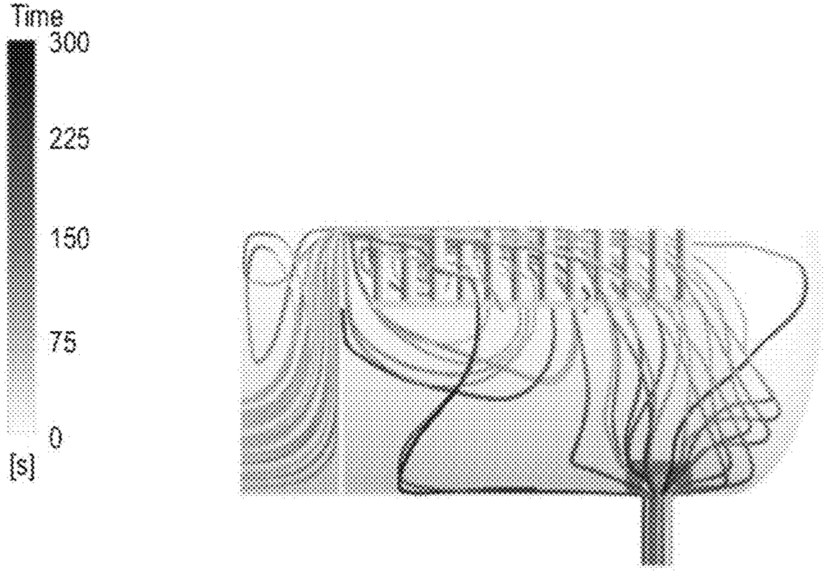
FIGS. 11A and 11B are side cross-section views of the flow patterns in two implementations of the inclusions of the hydrophobic mesh tubes.
Figure 11B:
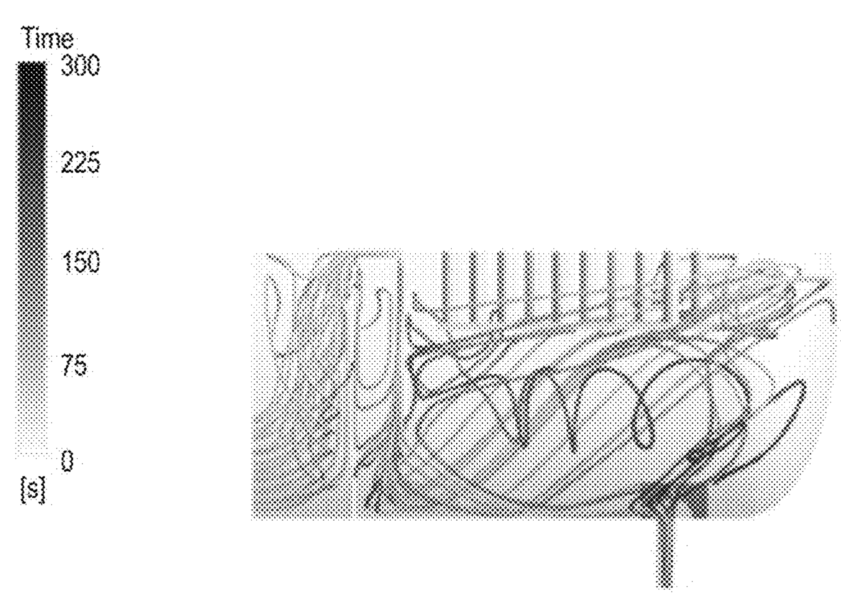

FIGS. 11A and 11B are side cross-section views of the flow patterns in two implementations of the inclusions of the hydrophobic mesh tubes. FIG. 11A is a drawing of streamlines in the water compartment with no water baffle and the tubes. The flow over the weir across the water compartment and turning downwards at the vessel wall. There is recirculation back up towards the liquid level.

FIG. 11B is a drawing of streamlines in the water compartment with the water baffle and the staggered hydrophobic tube assembly. The flow under the water baffle causing a recirculation zone up to the water level bringing oil up to the free surface for remove by the hydrophobic mesh tube assembly.

EMBODIMENTS

An embodiment described herein provides a water-oil separation plant (WOSEP). The WOSEP includes a gravity separation vessel, an inlet for an oil-in-water emulsion, an oil outlet for separated oil, a water compartment in the gravity separation vessel, and a water outlet from water compartment for separated water. A tube of hydrophobic mesh with an axis perpendicular to the water surface is disposed in the water compartment, wherein the top of the tube is above the water surface, and the bottom of the tube is below the water surface. An outlet coupled to the bottom of the tube allows oil and water to drain from the tube.

In an aspect, combinable with any other aspect, the hydrophobic mesh includes a stainless-steel copper-coated mesh functionalized with a hydrophobic material.

In an aspect, combinable with any other aspect, the hydrophobic material is a fatty acid.

In an aspect, combinable with any other aspect, the oil-in-water emulsion includes produced water at a concentration in a range of about 0.01 vol. % to about 10 vol. % oil dispersed in a bulk water flow through an inlet nozzle into a separation compartment.

In an aspect, combinable with any other aspect, the WOSEP includes an oil-in-water sensor that detects an oil concentration in the water compartment. In an aspect, the oil-in-water sensor includes an optical detector, an ultraviolet/visible fluorescence spectrometer, or an infrared spectrometer, or a combination thereof. In an aspect, the oil-in-water sensor includes an ultrasonic detector.

In an aspect, combinable with any other aspect the WOSEP includes a phase profile sensor.

In an aspect, combinable with any other aspect, the WOSEP includes a valve configured to activate when the oil-in-water sensor detects a targeted amount of oil in the water.

In an aspect, combinable with any other aspect, the WOSEP includes a steam inlet coupled to the outlet at the bottom of the tube.

Another embodiment described herein provides a method for separating an oil-in-water emulsion in a water oil separator vessel (WOSEP). The method includes flowing the oil-in-water emulsion into a separation compartment of the WOSEP, performing a gravity separation of a portion of the oil from the water in the separation compartment, and flowing separated water into a water compartment including a tube made from a hydrophobic mesh. Oily water that flows through the tube is collected through an outlet and separated water from the water compartment is removed through a water outlet.

In an aspect, combinable with any other aspect, the method includes skimming off oil that floats to a surface of the water in the separation compartment.

In an aspect, combinable with any other aspect, the method includes overflowing water over a water weir and under a water baffle into the water compartment.

In an aspect, combinable with any other aspect, the method includes manually operating skim nozzles in the water compartment to remove oil that floats to the surface.

In an aspect, combinable with any other aspect, the method includes determining when an oil-in-water concentration reaches a pre-determined threshold and activating a valve downstream of the outlet.

In an aspect, combinable with any other aspect, the method includes, while the valve is activated, iterating between determining if the oil-in-water concentration has dropped below the pre-determined threshold and deactivating the valve downstream of the outlet.

Another embodiment described herein provides a tube in a water compartment of a water oil separator vessel (WOSEP). The tube includes a hydrophobic mesh that separates oil from water in the water compartment.

In an aspect, combinable with any other aspect, the hydrophobic mesh allows oil to flow through the hydrophobic mesh.

In an aspect, combinable with any other aspect, the hydrophobic mesh blocks water from flowing through the hydrophobic mesh.

In an aspect, combinable with any other aspect, the tube includes an axis perpendicular to the water surface in a water compartment, wherein the top of the tube is above the water surface, and the bottom of the tube is below the water surface.

In an aspect, combinable with any other aspect, the hydrophobic mesh allows a substantial portion of oil to flow through the hydrophobic mesh while rejecting a substantial portion of the water.

In an aspect, combinable with any other aspect, the hydrophobic mesh includes a stainless-steel mesh with a copper coating that is treated to form a hydrophobic layer.

In an aspect, combinable with any other aspect, the hydrophobic layer includes a fatty acid that is functionalized on the copper surface.

Other implementations are also within the scope of the following claims.

What is claimed is:

1. A water-oil separator vessel (WOSEP), comprising:

a gravity separation vessel having an exterior and an interior, the interior having a top internal surface, a bottom internal surface, and a sidewall connecting the top internal surface and the bottom internal surface;

a separation compartment in the gravity separation vessel for receiving an oil-in-water emulsion from an inlet to the gravity separation vessel;

an oil outlet for receiving separated oil from the separation compartment;

a water compartment in the gravity separation vessel for receiving the oil-in-water emulsion from the separation compartment;

a water outlet from the water compartment for separated water;

a water baffle positioned between the separation compartment and the water compartment;

a tube of hydrophobic mesh disposed in the water compartment with an axis perpendicular to a water surface in the water compartment, wherein a top of the tube is positioned above a top surface of the water baffle, and a bottom of the tube is positioned above a bottom surface of the water baffle, and wherein the tube is configured to receive oil from the oil-in-water emulsion received from the separation compartment;

a water weir positioned between the separation compartment and the water baffle, wherein a top surface of the water weir is positioned below the top surface of the water baffle, and a bottom surface of the water weir is coupled to the bottom internal surface of the gravity separation vessel;

an oil baffle positioned between the separation compartment and the water weir, wherein a top surface of the oil baffle is positioned above the top surface of the water baffle, and a bottom surface of the oil baffle is positioned above the bottom surface of the water weir and below the top surface of the water weir;

an outlet from the gravity separation vessel coupled to the bottom of the tube; and a collection manifold coupling the bottom of the tube to the outlet, the collection manifold and outlet together configured to collect the oil and the water in the tube and to drain the oil and the water from the tube and the gravity separation vessel through the outlet.

2. The WOSEP of claim 1, wherein the hydrophobic mesh comprises a stainless-steel copper-coated mesh functionalized with a hydrophobic material.

3. The WOSEP of claim 2, wherein the hydrophobic material is a fatty acid.

4. The WOSEP of claim 1, wherein:

the inlet comprises an inlet nozzle into the separation compartment configured to disperse the oil-in-water emulsion in a bulk water flow; and the oil-in-water emulsion comprises produced water and about 0.01 vol. % to about 10 vol. % oil.

5. The WOSEP of claim 1, comprising an oil-in-water sensor that detects an oil concentration in the water compartment.

6. The WOSEP of claim 5, wherein the oil-in-water sensor comprises an optical detector, an ultraviolet/visible fluorescence spectrometer, or an infrared spectrometer, or a combination thereof.

7. The WOSEP of claim 5, wherein the oil-in-water sensor comprises an ultrasonic detector.

8. The WOSEP of claim 1, comprising a phase profile sensor.

9. The WOSEP of claim 5, comprising a valve configured to activate when the oil-in-water sensor detects a targeted amount of oil in the water.

10. The WOSEP of claim 1, comprising a steam inlet coupled to the outlet of the tube.

11. The WOSEP of claim 1, further comprising a plurality of the tubes in the water compartment, the bottoms of each of the plurality of tubes coupled to the collection manifold.

12. The WOSEP of claim 11, wherein the plurality of tubes are arranged in a uniform square array, a non-uniform square and staggered array, a phyllotaxis pattern, 45° staggered variations of the uniform square array, 45° staggered variations of the non-uniform square array, 90° staggered variations of the uniform square array, or 90° staggered variations of the non-uniform square array.

13. A method for separating an oil-in-water emulsion in a water oil separator vessel (WOSEP), comprising:

flowing the oil-in-water emulsion into a separation compartment of a gravity separation vessel of the WOSEP via an inlet to the gravity separation vessel, the gravity separation vessel having an exterior and an interior, the interior having a top internal surface, a bottom internal surface, and a sidewall connecting the top internal surface and the bottom internal surface;

performing a gravity separation of a portion of the oil from the water of the oil-in-water emulsion in the separation compartment;

flowing the separated water from the oil-in-water emulsion under an oil baffle, over a water weir, and under a water baffle into a water compartment comprising a tube made from a hydrophobic mesh and also configured to receive oily water from the separated water received from the separation compartment, wherein:

a top of the tube is positioned above a top surface of the water baffle, and a bottom of the tube is positioned below a bottom surface of the water baffle, the water baffle is positioned between the separation compartment and the water compartment, the water weir is positioned between the separation compartment and the water baffle, wherein a top surface of the water weir is positioned below the top surface of the water baffle, and a bottom surface of the water weir is coupled to the bottom internal surface of the gravity separation vessel;

the oil baffle is positioned between the separation compartment and the water weir, wherein a top surface of the oil baffle is positioned above the top surface of the water baffle, and a bottom surface of the oil baffle is positioned above the bottom surface of the water weir and below the top surface of the water weir;

collecting the oily water that flows through the tube of the water compartment through an outlet of the tube of the water compartment via a collection manifold coupling the bottom of the tube to the outlet, the collection manifold and outlet together configured to collect the oil water in the oily water in the tube and drain the oil water from the tube and the gravity separation vessel through the outlet; and removing separated water from the water compartment through a water outlet of the water compartment.

14. The method of claim 13, comprising skimming off oil that floats to a surface of the water in the separation compartment via the gravity separation.

15. The method of claim 13, comprising manually operating skim nozzles in the water compartment to remove oil that floats to the surface.

16. The method of claim 13, comprising:

determining when an oil-in-water concentration reaches a pre-determined threshold in the collection manifold; and activating a valve downstream of the outlet and the collection manifold when the oil-in-water concentration in the collection manifold reaches the pre-determined threshold.

17. The method of claim 16, comprising, while the valve is activated, iterating:

determining if the oil-in-water concentration in the collection manifold has dropped below the pre-determined threshold; and deactivating the valve downstream of the outlet and the collection manifold if the oil-in-water concentration in the collection manifold has dropped below the pre-determined threshold.

18. The method of claim 13, wherein the WOSEP comprises a plurality of the tubes in the water compartment, the bottoms of each of the plurality of tubes in the water compartment coupled to the collection manifold.

19. The method of claim 18, wherein the plurality of tubes are arranged in a uniform square array, a non-uniform square and staggered array, a phyllotaxis pattern, 45° staggered variations of the uniform square array, 45° staggered variations of the non-uniform square array, 90° staggered variations of the uniform square array, or 90° staggered variations of the non-uniform square array.

* * * * *